(12) United States Patent
Nakano (10) Patent No.: US 6,472,788 B1
(45) Date of Patent: Oct. 29, 2002

(54) MOTOR/GENERATOR HAVING TWO ROTORS

(75) Inventor: Masaki Nakano, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/693,845

(22) Filed: Oct. 23, 2000

(30) Foreign Application Priority Data

Oct. 27, 1999 (JP) .......................................... 11-306030

(51) Int. Cl.$^7$ .............................................. H02K 16/00
(52) U.S. Cl. ...................... 310/114; 310/112; 310/113
(58) Field of Search ................................ 310/114, 113, 310/129, 254, 259, 258, 216, 112

(56) References Cited

U.S. PATENT DOCUMENTS

| | | | | |
|---|---|---|---|---|
| 4,900,965 A | * | 2/1990 | Fisher | 310/216 |
| 6,049,152 A | | 4/2000 | Nakano | 310/114 |
| 6,226,856 B1 | * | 5/2001 | Kazama et al. | 29/596 |

FOREIGN PATENT DOCUMENTS

| | | |
|---|---|---|
| EP | 0 945 965 | 9/1999 |
| JP | 63-224637 | 9/1988 |
| JP | 1-303029 | 12/1989 |
| JP | 9-169235 | 7/1991 |
| JP | 5-3658 | 1/1993 |
| JP | 11-275856 | 10/1999 |

* cited by examiner

*Primary Examiner*—Joseph Waks
*Assistant Examiner*—Thanh Lam
(74) *Attorney, Agent, or Firm*—Foley & Lardner (57) ABSTRACT

An inner rotor (5) provided with a plurality of magnetic poles is disposed on an inner side of a ring-shaped stator (3) of a motor/generator (1). The outer rotor (7) provided with a number of magnetic poles is disposed on an outer side of the stator (3). The number of magnetic poles of the outer rotor (7) differs from the number of magnetic poles of the inner rotor (5). The stator (3) is provided with coils (16) simultaneously generating a magnetic field synchronized with the rotation of the inner rotor (5) and a magnetic field synchronized with the rotation of the outer rotor (7). The stator (3) is provided with a plurality of cores (3A) partitioned on a circumferential periphery and composed of a magnetic material to allow coils (16) to be wound thereon. Connectors (19) are provided connecting a part of one core (3A) to a part of an adjacent core (3A). One magnetic resistance is created on an inner peripheral section of cores (3A) located between the inner rotor (5) and the coils (16) and a second magnetic resistance is created on an outer peripheral section of the cores (3A) located between the outer rotor (7) and the coils (16). The ratio of these magnetic resistances may arbitrary be set by the arrangement of connectors (19).

12 Claims, 5 Drawing Sheets

FIG. 7

MOTOR/GENERATOR HAVING TWO ROTORS

FIELD OF THE INVENTION

This invention relates to a motor/generator which has two rotors and a single stator.

BACKGROUND OF THE INVENTION

Tokkai-Hei-11-275856 published by the Japanese Patent Office in 1999 discloses a synchronous motor/generator having two rotors and a single stator. Tokkai-Hei-11-275856 is a pre-examination publication of the Japanese patent application Tokugan-Hei-10-77449, the base of U.S. Pat. No. 6,049,152 that was issued after the priority date of this patent application.

A synchronous motor/generator disposes respective rotors superimposed co-axially in a radial direction on the outer and inner sides of a stator. Although the number of magnetic poles of the two rotors differs, the stator generates rotating magnetic fields by using one type of coil. The rotating magnetic fields consist of a rotating magnetic field which synchronizes the rotation of the inner rotor and a rotating magnetic field which synchronizes the rotation of the outer rotor. The inner and outer rotors are independently driven by applying a composite current to the single type of coil. The composite current comprises an alternating current generating the rotating magnetic field for the inner rotor and the alternating current generating the rotating magnetic field for the outer rotor. The stator comprises plate members laminated in an axial direction and is provided with a plurality of cores extending in a radial direction to allow wire to be wound thereon. When the motor/generator is assembled, the plate members are laminated and wire is wound onto each core.

SUMMARY OF THE INVENTION

In this motor/generator, leakage of magnetic flux which drives the inner rotor is defined by the magnetic resistance (hereafter termed "inner magnetic resistance") between inner peripheral sections of cores situated between the inner rotor and the coil.

The leakage of magnetic flux which drives the outer rotor is defined by the magnetic resistance (hereafter termed "outer magnetic resistance") between outer peripheral sections of cores situated between the outer rotor and the coil.

Characteristics of the motion of the motor/generator vary on the basis of the ratio of the inner magnetic resistance and the outer magnetic resistance (hereafter termed "magnetic resistance ratio"). For example, a power density, the power ratio of the inner rotor and the outer rotor or the ratio of the power source load factors of the inner rotor and the outer rotor varies on the basis of the magnetic resistance ratio. As a result, a desired magnetic resistance ratio differs depending on the required characteristics of the motor/generator.

However, in order to alter the magnetic resistance ratio, the design of the stator must be modified, so altering the magnetic resistance ratio during the manufacturing process of the motor/generator is difficult.

It is therefore an object of this invention to enable the magnetic resistance ratio of the stator to be set in an arbitrary manner during the manufacturing process of the motor/generator.

In order to achieve the above object, this invention provides a motor/generator comprising an inner rotor having a plurality of magnetic poles, an outer rotor having a plurality of magnetic poles which differs from the number of magnetic poles of the inner rotor, and a ring-shaped stator disposed between the inner rotor and the outer rotor. The stator is provided with a plurality of coils which simultaneously generate a magnetic field synchronized with the rotation of the inner rotor and a magnetic field synchronized with the rotation of the outer rotor. The stator is also provided with a plurality of cores on which the coils are wound. The cores are arranged in a circumferential direction and composed of a magnetic material. The cores have a connector magnetically connecting a part of a single core to a part of an adjacent core so as to set a magnetic resistance in a circumferential direction of an inner peripheral section of the cores located between the inner rotor and the coils and a magnetic resistance in a circumferential direction of an outer peripheral section of the cores located between the outer rotor and the coils.

The details as well as other features and advantages of this invention are set forth in the remainder of the specification and are shown in the accompanying drawings.

DESCRIPTION OF THE PREFERRED EMBODIMENTS

Figures 1, 2:
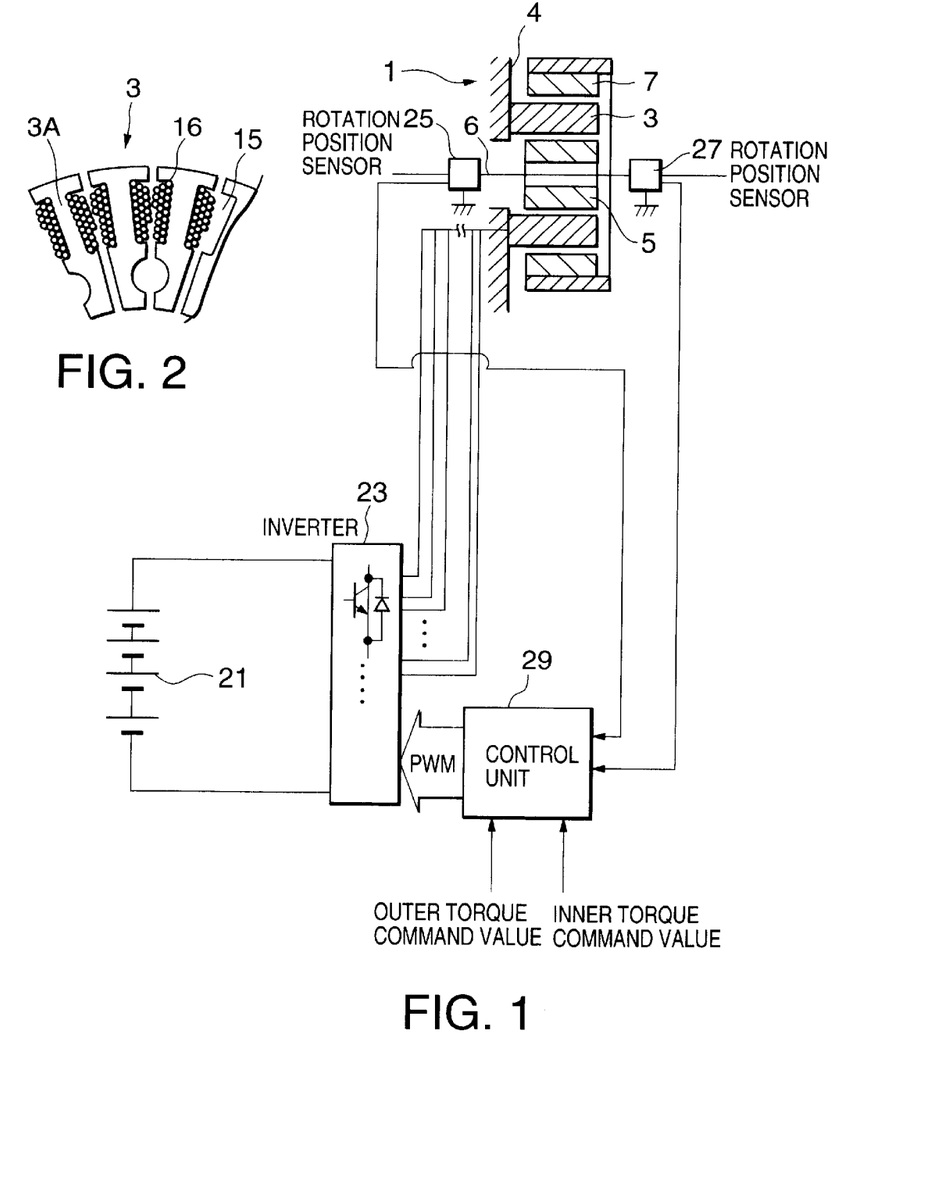
FIG. 1 is a schematic diagram of a motor/generator according to this invention.
FIG. 2 is a partial cross sectional view of a stator according to this invention.

Referring to FIG. 1 of the drawings, a motor/generator 1 according to this invention is provided with a stator 3, an inner rotor 5 facing an inner periphery of the stator 3 and an outer rotor 7 facing an outer periphery of the stator 3.

The inner rotor 5 is provided with a rotation shaft 6 and the outer rotor 7 is provided with a rotation shaft 8 which is positioned co-axially with the rotation shaft 6.

The inner rotor 5, the outer rotor 7 and the stator 3 are disposed co-axially and superimposed in a radial direction. The inner rotor 5 and the outer rotor 7 are supported to rotate freely on a case 4 by respective rotation shafts 6 and 8 and the stator 3 is fixed to the case 4.

The inner rotor 5 is formed by a permanent magnet, half the circumference of which forms an S pole and the other half of the circumference of which forms an N pole. The outer rotor 7 is formed by a permanent magnet having twice the number of magnetic poles as the inner rotor 5. That is to say, the S poles and N poles alternate every 90 degrees.

With the above ratio of magnetic poles, the magnet of the inner rotor 5 does not apply a magnetic force on the outer rotor 7 in a direction of rotation and the magnet of the outer rotor 7 does not apply a magnetic force on the inner rotor 5 in a direction of rotation.

Referring now to FIG. 2, the stator 3 comprises a plurality of cores 3A and coils 16 wound onto the cores 3A.

Figure 3A:
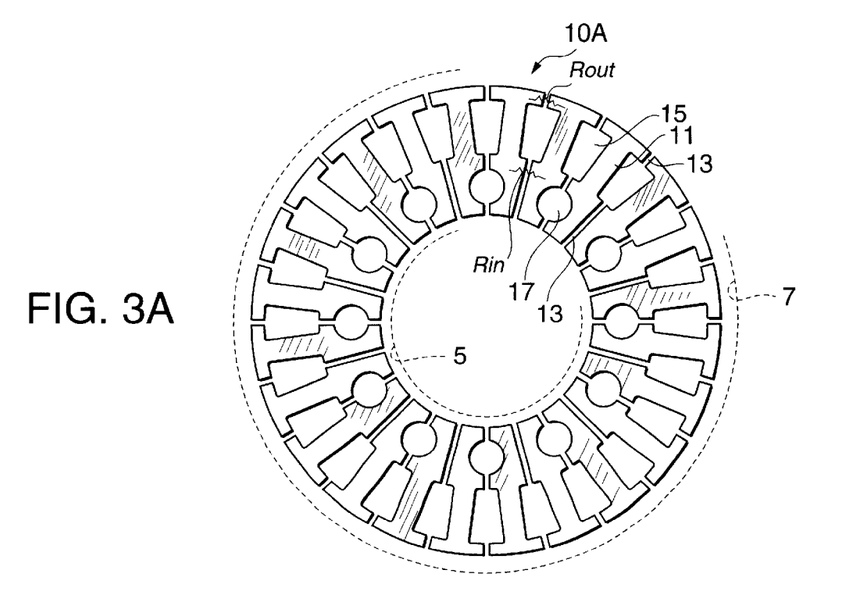
FIGS. 3A and 3B is a front view of a first plate unit and a second plate unit constituting the stator of the motor/generator.
Figure 3B:
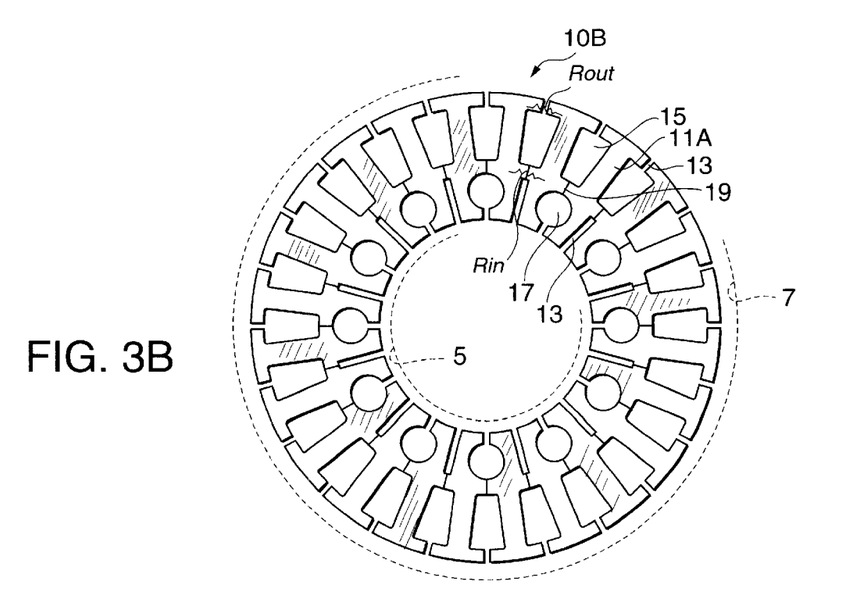

The cores 3A comprises tooth members 11 as shown in FIG. 3A and tooth members 11A as shown in FIG. 3B which are laminated with a fixed layer ratio in the direction along the rotation shaft 6. The tooth members 11 and 11A are formed from ferro-silicon plate of a 0.5 mm thickness which creates an insulating layer on their surfaces.

Referring to FIG. 3A, the tooth member 11 is disposed radially with a fixed interval 13 being maintained between the outer peripheral end of adjacent tooth members 11. Referring to FIG. 3B, the tooth member 11A is disposed radially in the same manner with a fixed gap 13 being maintained between the outer peripheral end of adjacent tooth members 11A.

Notches are pre-formed on the tooth member 11 to create a bolt hole 17 and a slot 15. The coil 16 wound onto the core 3A is accommodated in this slot 15. Notches are formed in the same manner on the tooth member 11A.

The tooth members 11 and 11A differ in the following respects.

As shown in FIG. 3B, the inner peripheral section of the tooth member 11A which is positioned between the slot 15 and the inner rotor 5 makes contact with the inner peripheral section of an adjacent tooth member 11A at a part 19. Thus the magnetic resistance of the inner peripheral sections of adjacent tooth members 11A is equal to zero.

In the following description, this contacting part is named as a connector 19. In contrast, the inner peripheral section forms a gap with respect to the adjacent tooth member 11 as shown in FIG. 3A. Thus the connector 19 is not disposed between the inner peripheral sections of adjacent tooth members 11 and the magnetic resistance of the inner peripheral sections of the tooth member 11 is much larger than that of the inner peripheral sections of the tooth members 11A.

The tooth members 11 and 11A are assembled in the following manner.

As shown in FIG. 3A, the first plate unit 10A has twenty four tooth members 11 aligned in a ring shape on the same flat surface. As shown in FIG. 3B, the second plate unit 10B has twenty four tooth members 11A aligned in a ring shape on the same flat surface.

Each core 3A is a lamination of the tooth members 11, 11A positioned at the same rotational angle as a result of laminating first plate units 10A and second plate units 10B at a fixed layer ratio and securing with each other by bolts inserted into the bolt holes.

The bolts inserted into the bolt holes 17 are formed of a non-magnetic material such as stainless steel or the like.

Connectors 19 are scattered in the direction along the rotation shaft 6 in the cores 3A at the locations of the second plate units 10B.

In the following description, the inner magnetic resistance of the adjacent cores 3A is designated as Rin, while the outer magnetic resistance thereof is designated as Rout. The inner magnetic resistance is a resistance between the inner peripheral sections of the cores 3A. The outer magnetic resistance is a resistance between the outer peripheral sections of the cores 3A.

The inner peripheral sections of the cores 3A form a leakage magnetic circuit for the driving magnetic flux of the inner rotor 5. The leakage of driving magnetic flux for the inner rotor 5 decreases as the inner magnetic resistance Rin increases.

The outer peripheral sections of the cores 3A form a leakage magnetic circuit for the driving magnetic flux of the outer rotor 7. The leakage of driving magnetic flux for the outer rotor 7 decreases as the outer magnetic resistance Rout increases.

The relationship of the leakage of magnetic flux of the inner magnetic resistance Rin and outer magnetic resistance Rout is relative. For example, when the inner magnetic resistance Rin is small, the leakage of driving magnetic flux passing through the inner peripheral sections of cores 3A increases while the leakage of driving magnetic flux passing through the outer peripheral sections of cores 3A decreases.

The connectors 19 are provided on sections facing the inner rotor 5 which has fewer magnetic poles than the outer rotor 7, for the following reason.

The number of boundaries of N pole and S pole fields increases as the number of rotating magnetic poles increases and thus the possibilities for leakage of magnetic flux in the stator increases. Thus the magnetic resistance between the tooth members must be greatly increased as the number of rotating poles increases or, in other words, as the number of magnetic poles of the rotors increases.

The inner rotor 5 has two magnetic poles and the outer rotor 7 has four magnetic poles. Thus it is preferred that the outer magnetic resistance Rout should be greater than the inner magnetic resistance Rin.

The connectors 19 are provided on the inner peripheral sections of the core 3A in order to realize the above relationship.

By selectively applying the layer number ratio of first plate units 10A and second plate units 10B in an assembling process of the cores 3A, the ratio Rin/Rout of the inner magnetic resistance Rin and the outer magnetic resistance Rout of cores 3A can be set in an arbitrary manner.

After the cores 3A are assembled, the coils 16 are formed by winding wire onto each core 3A. It is possible to cool the stator 3 by passing a cooling medium such as hydrogen gas, air or the like through the gap 13.

Returning now to FIG. 1, an electric current is supplied from the inverter 23 to the coils 16 of the stator 3. The inverter 23 comprises a fixed number of transistors and an equal number of diodes. A pulse width modulation signal is output from a control unit 29 to each gate of the inverter 23, that is to say, to the base of the transistor. The inverter 23 outputs a composite alternating current to the coils 16 of the stator 3 in response to the PWM signal.

In order to control the composite alternating current, signals are input to the control unit 29 from a rotation position sensor 25 detecting the rotational position of the inner rotor 5 and a rotation position sensor 27 detecting the rotational position of the outer rotor 7. Inner torque command values indicating a target torque of the inner rotor 5 and outer torque command values indicating a target torque of the outer rotor 7 are also input to the control unit 29.

The torque command value is a positive value when the rotor functions as a motor and a negative value when the rotor is driven as a generator. The control unit 29 calculates a current required to generate the rotating magnetic field to realize the inner torque command value based on the detected rotational position of the inner rotor 5 and the inner torque command value.

In the same manner, the current required to generate the rotating magnetic field to realize the outer torque command value is calculated based on the rotational position of the outer rotor 7 and the outer torque command value.

By outputting PWM signals to the inverter 23, the control unit 21 controls the inverter 23 so that the inverter 23 provides the coils 16 with a composite current of the above two types of the currents. This principle is disclosed in the above-mentioned Tokkai-Hei-11-275856.

Figure 4:
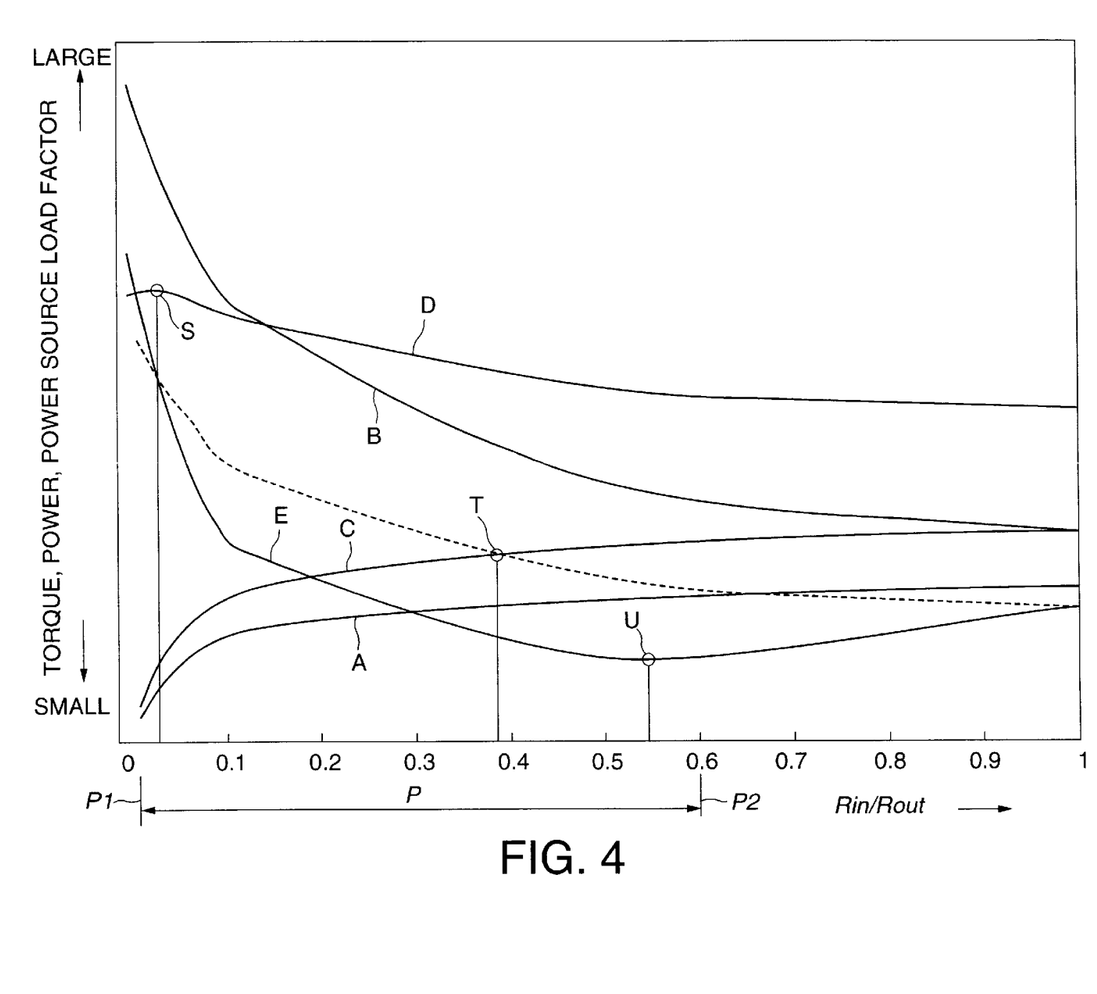
FIG. 4 is a diagram showing a relation between the magnetic resistance ratio and various characteristics of the motor/generator.

Referring to FIG. 4, the various characteristics of the motor/generator 1 are determined by the magnetic resistance ratio Rin/Rout of the cores 3A.

In the figure, the curved line A shows torque acting on the inner rotor 5 (hereafter termed "inner torque"). The curved line B shows torque acting on the outer rotor 7 (hereafter termed "outer torque"). The curved line C shows power of the inner rotor 7 (hereafter termed "inner power"). The curved line D shows the sum of the inner power and power of the outer rotor 7 (hereafter termed "outer power"). The curved line E shows the power source load factor.

The outer power is obtained by subtracting the inner power from the sum of the power. The power source load factor is the ratio of the absolute value of the power supplied by the battery 21 and the absolute value of the sum of the inner power and outer power.

The point S shows the point of maximum power density and represents the maximum value of the sum of the power. The total output of the motor/generator is a maximum at the maximum point of power density. The point S is obtained when the magnetic resistance ratio Rin/Rout has a value of approximately 0.03.

The point T shows the power equivalence point where the inner power and the outer power are equal. When one rotor 5 or 7 is driven as a generator and the other rotor 5 or 7 is driven as a motor with the generated electrical energy, it is possible to use the electrical energy most efficiently at this point. The point T is obtained when the magnetic resistance ratio Rin/Rout has a value of approximately 0.38.

The point U shows the minimum point for power source load factor which is the point at which the efficiency of the inverter 23 becomes the maximum and calorific value of the inverter 23 is minimized. The point U is obtained when the magnetic resistance ratio Rin/Rout has a value of approximately 0.54.

Thus the magnetic resistance ratio Rin/Rout desired for the core 3A and the corresponding layer number ratio of the first plate units 10A and the second plate units 10B are determined based on the required motion characteristics of the motor/generator, and the plurality of cores 3A are assembled by laminating the plate units 10A, 10B under the determined layer number ratio.

In the above manner, it is possible to vary the magnetic resistance ratio Rin/Rout during the manufacturing process in an arbitrary manner in response to the required motion characteristics without varying the design of the stator 3.

The layer number ratio of the first plate unit 10A and the second plate unit 10B are determined in the following manner.

The magnetic resistance ratio of the first plate unit 10A, the magnetic resistance ratio of the second plate unit 10B and the desired magnetic resistance ratio of the core 3A are designated by $\alpha$, $\beta$, $\gamma$ respectively. The total number of layers of the plate units 10A and 10B is taken to be N, and the number of layers of the first plate unit 10A is taken to be X.

The core 3A creates an extremely large magnetic resistance in an axial direction due to the formation of an insulating layer on the surface of the tooth member 11, 11A. The magnitude of the magnetic resistance is approximately proportional to the number of layers. The following relationship is established on the basis of the above arrangement.

$$\gamma = \alpha \cdot \frac{X}{N} + \beta \cdot \frac{1-X}{N}$$

where, $\alpha > \beta$, and
X=1,2, ... ,N.

When it is desired to set the magnetic resistance ratio of the core 3A to $\gamma$, the layer ratio Y/N of the first plate units 10A may be set to a value satisfying the above formula. The values of the magnetic resistance ratio $\alpha$ of the first plate unit 10A and the value of the magnetic resistance ratio $\beta$ of the second plate unit 10B may be appropriately varied by varying structure of the plate units 10A and 10B, that is to say, the number, dimensions and shape of the tooth members 11, 11A.

The lower limit P1 of the settable range of the magnetic resistance ratio $\gamma$ of the core 3A is the magnetic resistance ratio Rin/Rout of the core 3A when the layer number ratio of the first plate unit 10A is 0% and the layer number ratio of the second plate unit 10B is 100%. The upper limit P2 is the magnetic resistance ratio Rin/Rout of the core 3A when the layer number ratio of the first plate unit 10A is 100% and the layer number ratio of the second plate unit 10B is 0%. In FIG. 3a and 3b, the magnetic resistance ratio $\alpha$ of the first plate unit 10A is set to 0.6 and the magnetic resistance ratio $\beta$ of the second plate unit 10B is set to a value which is close to 0.

Thus it is possible to facilitate the variation of the characteristics of the motion of the motor/generator under the same basic design by assembling two types of plate units 10A and 10B with a layer number ratio calculated as above.

Figure 5:
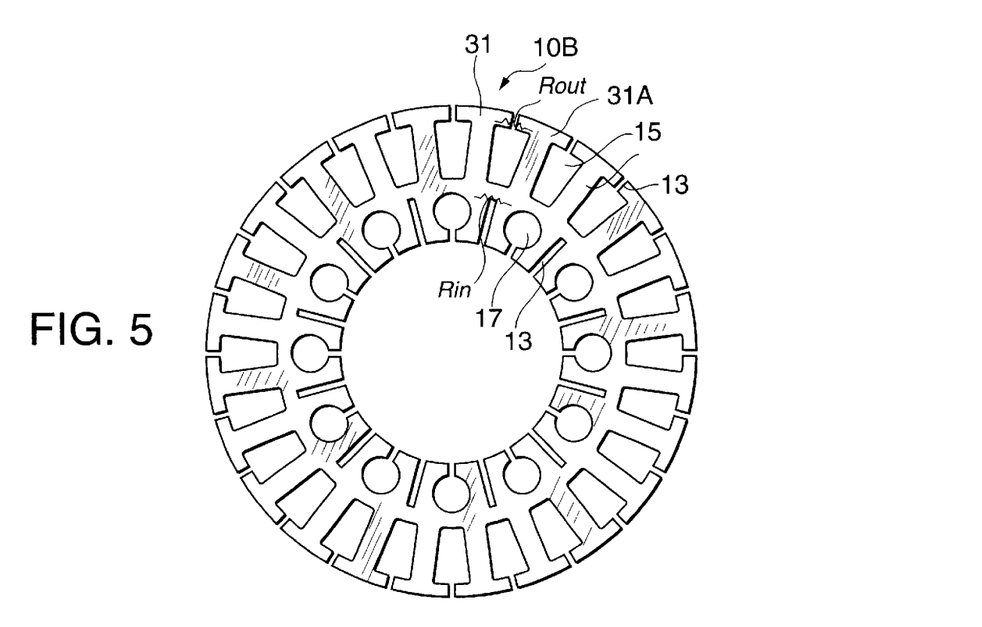
FIG. 5 is a front view of the second plate unit according to a second embodiment of this invention.

A second embodiment of this invention will now be described with reference to FIG. 5.

This embodiment differs from the first embodiment with reference to the structure of the second plate unit 10B. In other respects, the second embodiment is the same as the first embodiment.

The second plate unit 10B is formed from a ferro-silicon plate formed as a single plate 31.

The second plate unit 10B is provided with a plurality of tooth members 31A extending in a radial direction. A gap 13 is formed between the outer ends of adjacent tooth members 31A. On the other hand, the inner peripheral sections of the tooth members 31A are contiguous in a circumferential direction.

Thus the magnetic resistance in a circumferential direction between the inner peripheral sections of the tooth members is extremely small. The first plate unit is exactly the same as the first plate unit 10A as described in the first embodiment.

The second embodiment allows the inner magnetic resistance Rin to be further reduced below that of the second plate unit 10B in the first embodiment.

A third embodiment of this invention will be described below with reference to FIG. 6 and FIG. 7.

In this embodiment, the core 3A is formed by laminating a single type of plate unit 40 in place of the two types of plate units 10A and 10B used in the first and second embodiments.

Figure 6:
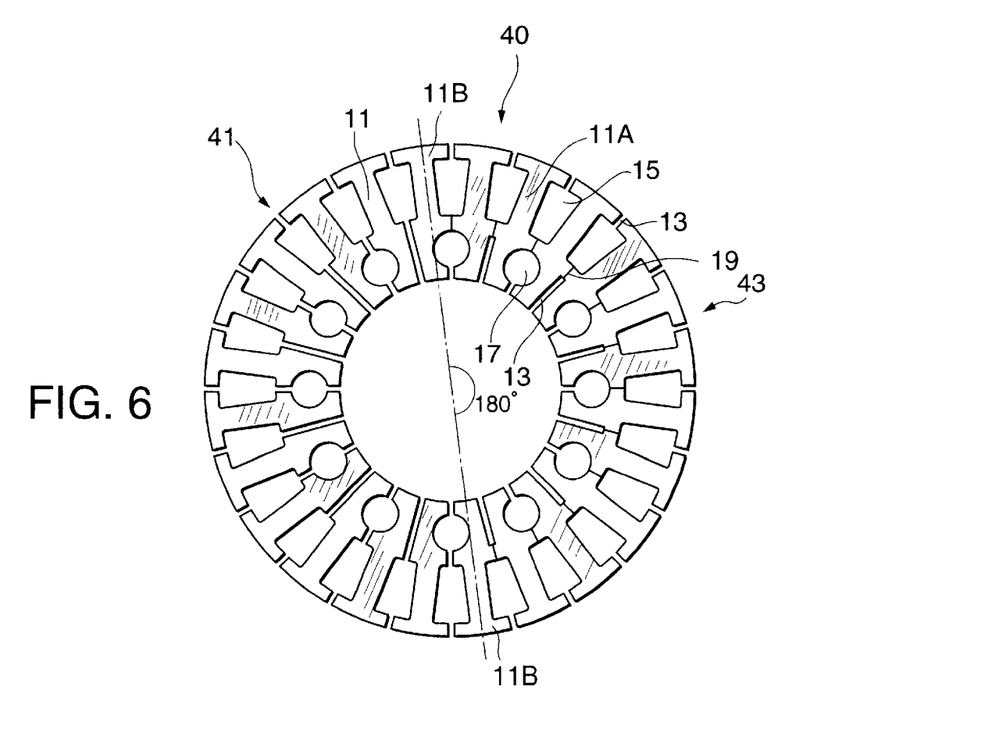
FIG. 6 is a front view of a plate unit according to a third embodiment of this invention.

Referring to FIG. 6, the plate unit 40 is divided into two sections 41, 43, each of which corresponds to 180 degrees of the plate unit 40.

The section 41 is formed from the tooth members 11 of the first embodiment. The section 43 is formed from the tooth members 11A of the first embodiment.

Figure 7:
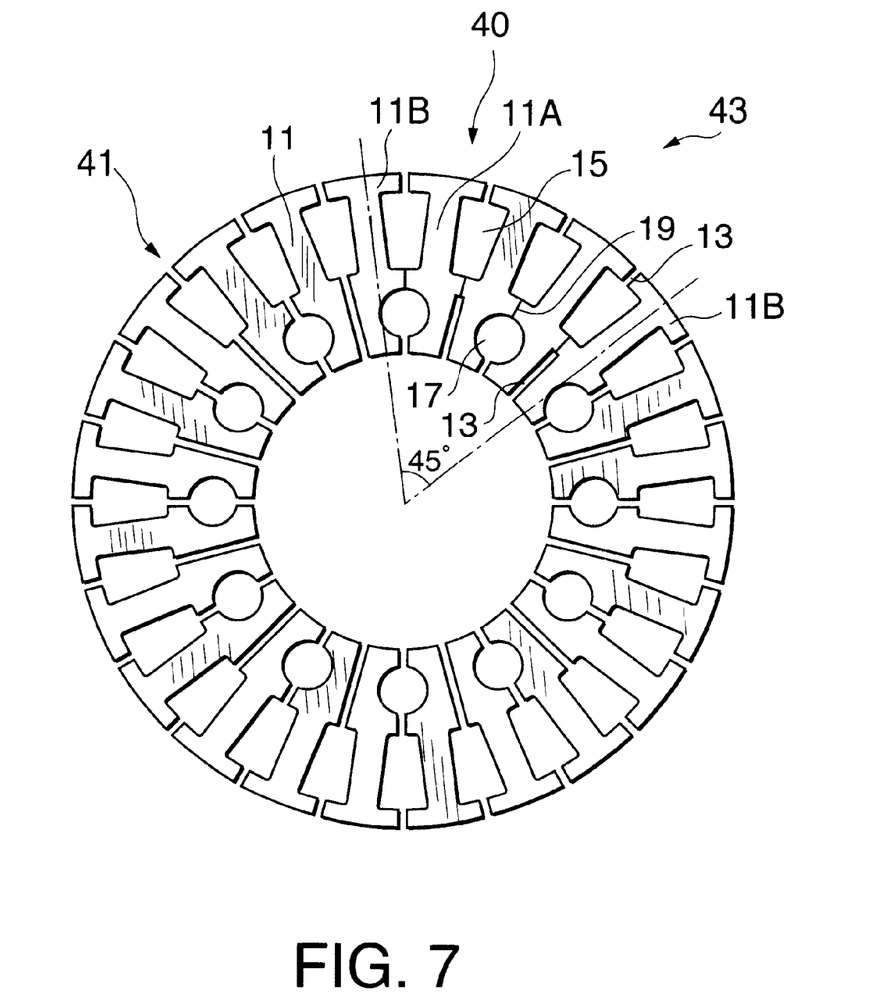
FIG. 7 is a front view of a plate unit according to a third embodiment of this invention.

The plate unit 40 shown in FIG. 7 is divided into a 315-degree section 41 formed of the tooth members 11 and a 45-degree section 43 formed of the tooth members 11A.

In either case, the tooth members 11B disposed on the border of the sections 41 and 43 form halves equal to the shape of the tooth members 11. The remaining halves have a shape equal to the tooth members 11A.

As shown above, the magnetic resistance ratio Rin/Rout when the core 3A is formed by the lamination of the plate units 40 can be arbitrarily set by varying the angle ratio of the sections 41 and 43. In this embodiment, connectors 19 are only provided only at a specific angular range in the circumferential direction of the plate unit 40.

In this embodiment, the tooth members 11 and 11A are combined. However it is possible to combine a single plate unit by assembling the tooth members 11 with the second plate unit 10B of the second embodiment.

When the plate units 40 are laminated to form the core 3A, it is preferred to shift the position of the section 43 in a rotational direction at each layer so as to create an even distribution of sections 43. In this manner, it is possible to ensure an even heat distribution in the stator 3 and to improve cooling.

The contents of Tokugan Hei 11-306030, with a filing date of Oct. 27, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, it is possible to combine the plate unit 40 of the third embodiment with the two types of plate unit 10A and 10B in the first and second embodiments.

The embodiments of this invention in which an exclusive property or privilege is claimed are defined as follows:

What is claimed is:

1. A motor/generator comprising:
   an inner rotor having a plurality of magnetic poles;
   an outer rotor having a plurality of magnetic poles which differs from the number of magnetic poles of the inner rotor, the inner rotor and the outer rotor being coaxially disposed and rotating independently from each other; and
   a ring-shaped stator disposed between the inner rotor and the outer rotor, the stator being provided with a plurality of coils, the coils simultaneously generating a magnetic field synchronized with the rotation of the inner rotor and a magnetic field synchronized with the rotation of the outer rotor, and a plurality of cores on which the coils are wound, the cores being arranged in a circumferential direction and composed of a magnetic material and having a connector magnetically connecting a part of a single core to a part of an adjacent core so as to set a magnetic resistance in a circumferential direction of an inner peripheral section of the cores located between the inner rotor and the coils and a magnetic resistance in a circumferential direction of an outer peripheral section of the cores located between the outer rotor and the coils.

2. The motor/generator as defined in claim 1, wherein the connector is provided on a section, among the inner peripheral section and the outer peripheral section, facing either one of the inner rotor and the outer rotor which has fewer magnetic poles.

3. The motor/generator as defined in claim 2, wherein the motor/generator further comprises a rotation shaft, the stator, the inner rotor and the outer rotor are disposed co-axially with respect to the rotation shaft, and the cores have a plurality of connectors scattered in a direction of the rotation shaft.

4. The motor/generator as defined in claim 1, wherein the cores have a plurality of connectors scattered in a circumferential direction of the stator.

5. The motor/generator as defined in claim 1, wherein the stator, the inner rotor and the outer rotor are disposed co-axially with respect to a rotation shaft, and cores are formed by a plurality of tooth members laminated in a direction along the rotation shaft.

6. The motor/generator as defined in claim 5, wherein the plurality of laminated tooth members are magnetically insulated with respect to each other.

7. The motor/generator as defined in claim 5, wherein the cores are formed by a first plate unit comprising a plurality of first tooth members disposed at equal intervals on a circumferential periphery, adjacent first tooth members on the circumferential periphery being insulated by a gap, and a second plate unit comprising the same number of second tooth members as the number of the first tooth members, the second tooth members being disposed at equal intervals on a circumferential periphery and provided with connectors between adjacent tooth members on a circumferential periphery, and the first plate unit and the second plate unit are laminated in the direction of the rotation shaft at a predetermined number ratio.

8. The motor/generator as defined in claim 7, wherein each of the connectors comprises a connection point magnetically connecting one second tooth member with an adjacent second tooth member.

9. The motor/generator as defined in claim 5, wherein the cores are formed by a plurality of plate units laminated in the direction of the rotation shaft, each of the plate units comprising a plurality of first tooth members disposed across a first angular range at equal intervals on a circumferential periphery, adjacent first tooth members on the circumferential periphery being insulated by a gap, and a plurality of second tooth members disposed across a second angular range, the second tooth members being provided with connectors between adjacent tooth members on a circumferential periphery.

10. The motor/generator as defined in claim 9, wherein the sum of the first angular range and the second angular range corresponds to three hundred and sixty degrees.

11. The motor/generator as defined in claim 9, wherein the second angular ranges of the plates units are shifted with each other in a circumferential direction so that connectors are distributed evenly in a circumferential direction about the rotation shaft.

12. A motor/generator comprising:
   an inner rotor having a plurality of magnetic poles;
   an outer rotor having a plurality of magnetic poles which differs from the number of magnetic poles of the inner rotor; and
   a ring-shaped stator disposed between the inner rotor and the outer rotor, the stator being provided with a plurality of coils, the coils simultaneously generating a magnetic field synchronized with the rotation of the inner rotor and a magnetic field synchronized with the rotation of the outer rotor, and a plurality of cores on which the coils are wound, the cores being arranged in a circumferential direction and composed of a magnetic material and having a connector magnetically connecting a part of a single core to a part of an adjacent core so as to set a magnetic resistance in a circumferential direction of an inner peripheral section of the cores located between the inner rotor and the coils and a magnetic resistance in a circumferential direction of an outer peripheral section of the cores located between the outer rotor and the coils, wherein the stator, the inner rotor and the outer rotor are disposed co-axially with respect to a rotation shaft, and cores are formed by a plurality of tooth members laminated in a direction along the rotation shaft, wherein the cores are formed by a first plate unit comprising a plurality of first tooth members disposed at equal intervals on a circumferential periphery, adjacent first tooth members on the circumferential periphery being insulated by a gap, and a second plate unit comprising the same number of second tooth members as the number of the first tooth members, the second tooth members being disposed at equal intervals on a circumferential periphery and provided with connectors between adjacent tooth members on a circumferential periphery, and the first plate unit and the second plate unit are laminated in the direction of the rotation shaft at a predetermined number ratio, and wherein the second plate unit comprises a single magnetic plate which has second tooth members, inner peripheral sections of which are made to be contiguous in a circumferential direction and the connectors comprise contiguous parts of the inner peripheral sections of the second tooth members.

* * * * *